United States Patent
Wright

(10) Patent No.: US 9,803,778 B2
(45) Date of Patent: Oct. 31, 2017

(54) HEATER CONTROL FOR AN AIR DRYER

(71) Applicant: NEW YORK AIR BRAKE, LLC, Watertown, NY (US)

(72) Inventor: Eric C. Wright, Evans Mills, NY (US)

(73) Assignee: NEW YORK AIR BRAKE, LLC, Watertown, NY (US)

(*) Notice: Subject to any disclaimer, the term of this patent is extended or adjusted under 35 U.S.C. 154(b) by 90 days.

(21) Appl. No.: 14/865,781

(22) Filed: Sep. 25, 2015

(65) Prior Publication Data

US 2017/0089481 A1    Mar. 30, 2017

(51) Int. Cl.
*F16K 49/00* (2006.01)
*B60T 17/00* (2006.01)
*B60T 17/22* (2006.01)

(52) U.S. Cl.
CPC ............ *F16K 49/00* (2013.01); *B60T 17/006* (2013.01); *B60T 17/00* (2013.01); *B60T 17/22* (2013.01)

(58) Field of Classification Search
CPC ....................................................... F16K 49/00
USPC ........................................ 137/79, 59; 96/112
See application file for complete search history.

(56) References Cited

U.S. PATENT DOCUMENTS

| | | | |
|---|---|---|---|
| 4,197,095 A * | 4/1980 | White, Jr. .......... | B01D 53/0454 95/122 |
| 4,601,114 A * | 7/1986 | Noguchi .............. | B01D 53/261 34/451 |
| 4,878,512 A * | 11/1989 | Pirkel ..................... | F16K 17/38 137/341 |
| 6,375,722 B1 * | 4/2002 | Henderson ......... | B01D 53/0454 96/112 |
| 7,322,188 B2 * | 1/2008 | Cline ..................... | F16K 49/00 239/135 |
| 7,632,076 B2 | 12/2009 | Seitz et al. | |
| 7,677,265 B2 * | 3/2010 | Shikata ................. | F16K 27/003 137/341 |
| 8,647,409 B2 * | 2/2014 | Hashi ................. | B01D 53/0462 62/640 |
| 8,951,339 B2 * | 2/2015 | Henderson ............. | F16K 49/00 417/43 |

FOREIGN PATENT DOCUMENTS

| | | |
|---|---|---|
| DE | 102009032953 | 1/2011 |
| DE | 102014203396 | 8/2015 |
| JP | H09122434 | 5/1997 |
| WO | 00/01466 | 1/2000 |

OTHER PUBLICATIONS

International Search Report Form PCT/ISA/220, International Application No. PCT/US2015/052269, pp. 1-12, dated Jun. 30, 2016.

* cited by examiner

*Primary Examiner* — Umashankar Venkatesan
(74) *Attorney, Agent, or Firm* — Bond Schoeneck & King, PLLC; David Nocilly

(57) ABSTRACT

An air dryer having a heater element associated with its valves to prevent freezing at cold temperatures. The air dryer includes a temperature sensor and an electronic controller that reads the temperature sensor and inhibits actuation of the valves whenever the temperature of valves is below freezing or a predetermined temperature that indicates a risk for freezing until the valves have been sufficiently warmed by the heater to avoid freezing during operation.

6 Claims, 4 Drawing Sheets

HEATER CONTROL FOR AN AIR DRYER

BACKGROUND OF THE INVENTION

1. Field of the Invention

The present invention relates to railway air system air dryers and, more particularly, to an air dryer having a heating control system for preventing freezing of valves.

2. Description of the Related Art

A typical "twin-tower" desiccant-type air dryer includes two drying circuits that are controlled by valves. Wet inlet air flows through one circuit to remove water vapor, while dry product air counter flows through the other circuit to remove the accumulated water and regenerate the desiccant. Inlet and outlet valves for each pneumatic circuit are responsive to controlling electronics to switch the air flow between the two circuits so that one circuit is always drying while the other is regenerating. The air dryer may include a pre-filtration stage with a water separator and/or coalescer positioned upstream of the drying circuits. The pre-filtration stage removes liquid phase and aerosol water and oil that can accumulate in air supply system as a result of the compression of ambient air by the locomotive air compressors. A pre-filtration stage includes a drain valve that is used to periodically purge any accumulated liquid. For example, a typical pre-filtration drain valve actuation cycle might command a purge (open) for two seconds every two minutes.

The air dryer valves, including any pre-filtration drain valve, are constantly subjected to wet air and thus prone to freezing at low temperatures. In order to counteract this problem, a heater element may be provided to warm the valves sufficiently to prevent freezing. Unfortunately, it takes time to sufficiently warm the valves when the air supply system is powered up from a cold temperature. If any of the valves are commanded open before they are sufficiently warmed, the valves can freeze in the open position. If a valve remains in an open position when it should otherwise be closed, there is a risk of an uncontrollable venting of the compressed air from the locomotive air supply system. Further, due to the high volume of air flowing through the frozen valve, the heater may not have sufficient power to thaw the frozen valve, if it is frozen open. Thus, there is a need for a heating control system that ensures that the valves are sufficiently warmed before they are operated so that they do not freeze.

BRIEF SUMMARY OF THE INVENTION

The present invention comprises an air dryer having an inlet for receiving compressed air, a series of valves positioned in a valve block for controlling the movement of the compressed air through a desiccant, a heater configured to warm the valve block, a temperature sensor for outputting a signal indicating the temperature of at least a portion of the air dryer, and a controller piloting the series of valves. To prevent a risk of the valves freezing when operated, the controller is programmed to inhibit operation of the series of valves until the signal received from the temperature sensor indicates that the series of valves are warm enough that they will not freeze when operated. The series of valves may include a pair of inlet valves and a pair of exhaust valves associated with a twin-tower dessicant air dryer. The series of valves may also include a drain valve associated with a pre-filtration stage. The temperature sensor is preferably positioned to determine the temperature of air flowing through the air dryer, but may be installed in the valve block or positioned to detect the outside temperature.

The present invention also comprises a method of preventing frozen air dryer valves that involves the use of an air dryer comprising an inlet for receiving compressed air, a series of valves positioned in a valve block for controlling the movement of the compressed air through a desiccant, a heater configured to warm the valve block, a temperature sensor for outputting a signal indicating the temperature of at least a portion of the air dryer, a controller piloting the series of valves. The signal indicating the temperature in the air dryer is received by the controller from the temperature sensor, and then the controller inhibits operation of the series of valves if the signal received from the temperature sensor indicates that any of the series of valves could freeze when operated.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
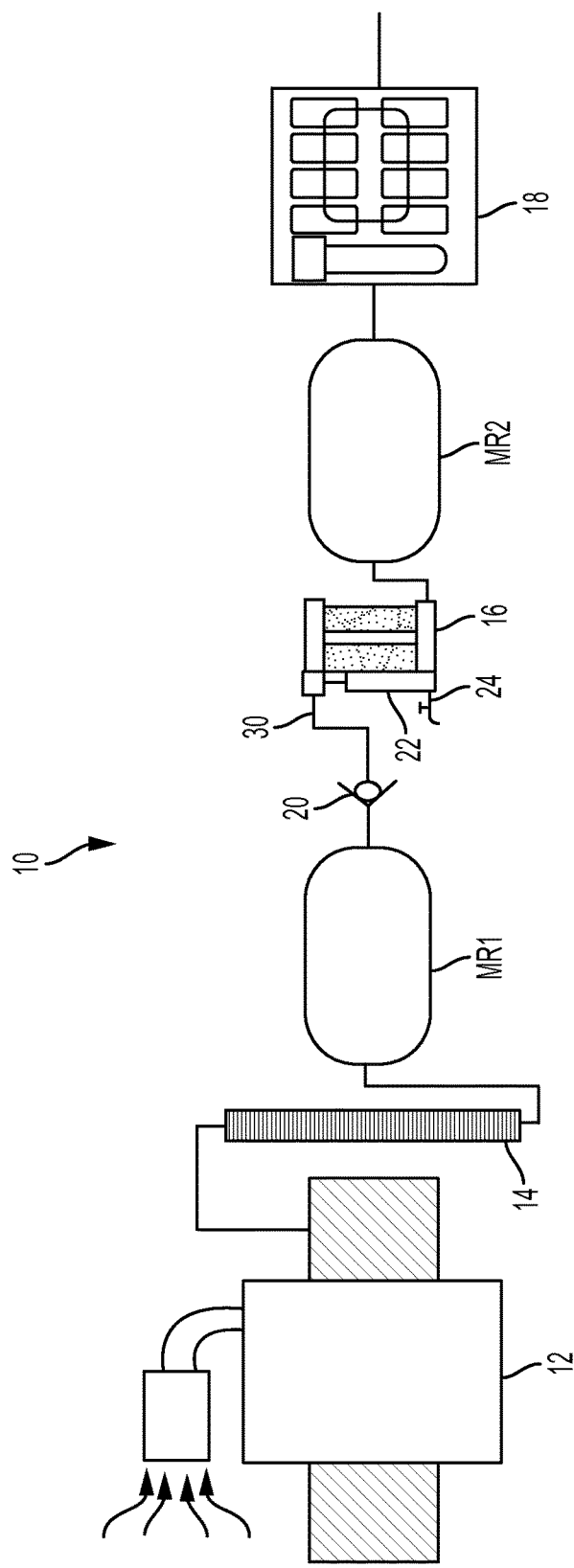
FIG. 1 is a schematic of a locomotive air supply system having an air dryer having a heated valve block according to the present invention.

Referring now to the drawings, wherein like reference numerals refer to like parts throughout, there is seen in FIG. 1 a locomotive air system 10 having an air compressor 12, aftercooler 14, first and second main reservoirs MR1 and MR2, and a two-tower desiccant air dryer 16 having heater control according to the present invention, as more fully described below. Second main reservoir MR2 is coupled to the braking system 18 and a check valve 20 is positioned between the first and second main reservoirs MR1 and MR2. A pre-filtration stage 22 is associated with air dryer 16 and includes a drain valve 24 that is operated according to a drain valve purge cycle time.

Figure 2:
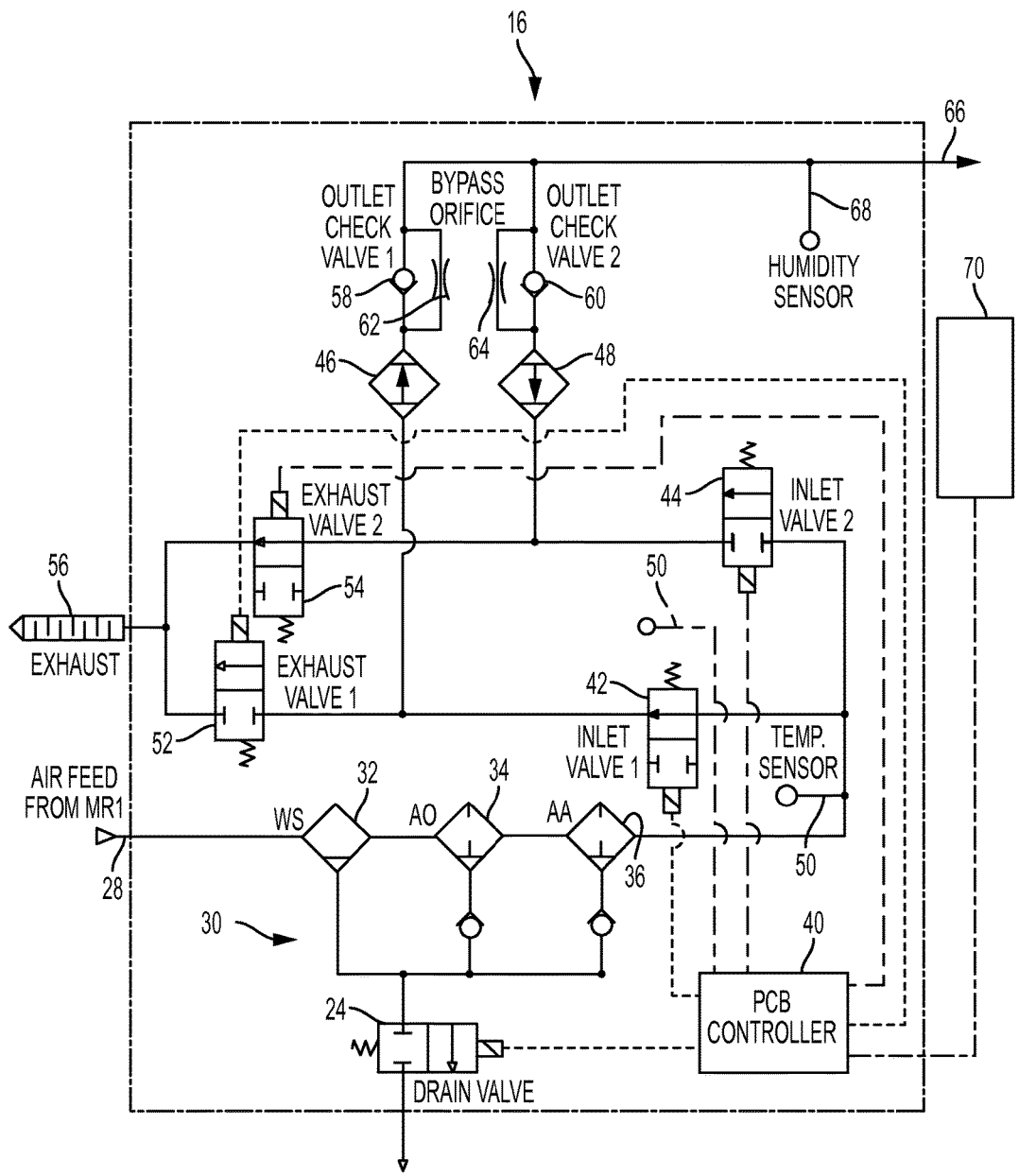
FIG. 2 is a schematic of an air dryer with integral pre-filtration stage and a heated valve block according to the present invention.

Referring to FIG. 2, two-tower desiccant air dryer 16 comprises an inlet 28 for receiving air from first main reservoir MR1. Inlet 28 is in communication with pre-filtration stage 30, shown as comprising a water separator 32, a coarse coalescer 34, and a fine coalescer 36. Any accumulated liquids in water separator 32, coarse coalescer 34, and fine coalescer 36 are expelled through drain valve 24. A pair of inlet valves 42 and 44 are positioned downstream of pre-filtration stage 30 for diverting incoming air between one of two pathways, each of which is associated with one of two dessicant towers 46 and 48. A temperature sensor 50 is positioned upstream of inlet valves 42 and 44 and downstream of pre-filtration stage 30. Optionally, the temperature, or a second temperature sensor may be located in the valve block housing the series of valves. The first pathway downstream of first inlet valve 42 leads to an exhaust valve 52 and first desiccant tower 46. The second pathway downstream of second inlet valve 44 leads to a second exhaust valve 54 and second desiccant tower 48. The first pathway further includes a first check valve 58 and first bypass orifice 62 downstream of first desiccant tower 46, and the second pathway further includes a second check valve 60 and bypass orifice 64 downstream of second desiccant tower 48. A single outlet 66 is coupled to the end of the first and second pathways, and a humidity sensor 68 is positioned upstream of outlet 66. Inlet valves 42 and 44 and outlet valves 52 and 54 are piloted by controller 40. Controller 40 operates inlet valves 42 and 44 and outlet valves 52 and 54 so that compressed air provided at inlet 28 is directed through one of desiccant towers 46 or 48 for drying. The other of desiccant towers 46 or 28 may be regenerated by allowing dried air to reflow through bypass orifice 62 or 64 and out of exhaust valve 52 or 54 as needed. Controller 40 is also in communication with temperature sensor 50 and humidity sensor 68. A heating element 70 may also be coupled to controller 40 and positioned in air dryer 16 to warm drain valve 24, inlet valves 42 and 44 and outlet valves 52 and 54 if the temperature is below freezing.

Figure 3:
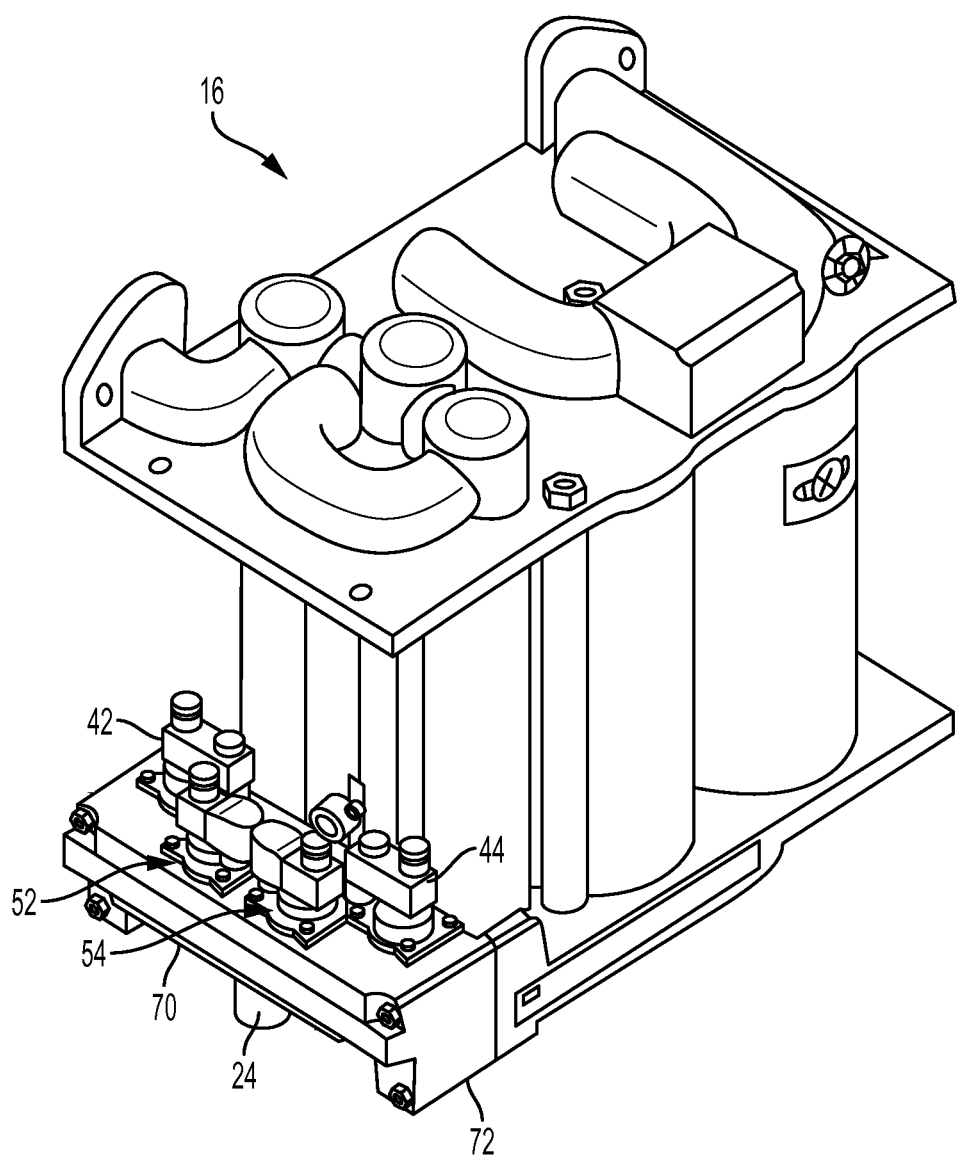
FIG. 3 is a schematic of a heated valve block of an air dryer with pre-filtration state according to the present invention.

As seen in FIG. 3, the air dryer pathways seen in FIG. 1 are arranged so that drain valve 24, inlet valves 42 and 44, and outlet valves 52 and 54 are commonly located along with heater element 70 in a valve block 72. As explained above, air dryer 16 includes temperature sensor 50 for determining the approximate temperature of valve block 72 and thus drain valve 24, inlet valves 42 and 44, and outlet valves 52 and 54. Temperature sensor 76 is shown as being positioned to detect the temperature of air passing through air dryer 16, but may be positioned to detect the temperature of valve block 72, the temperature of the inlet air, the temperature of ambient air, or some combination of the above.

Figure 4:
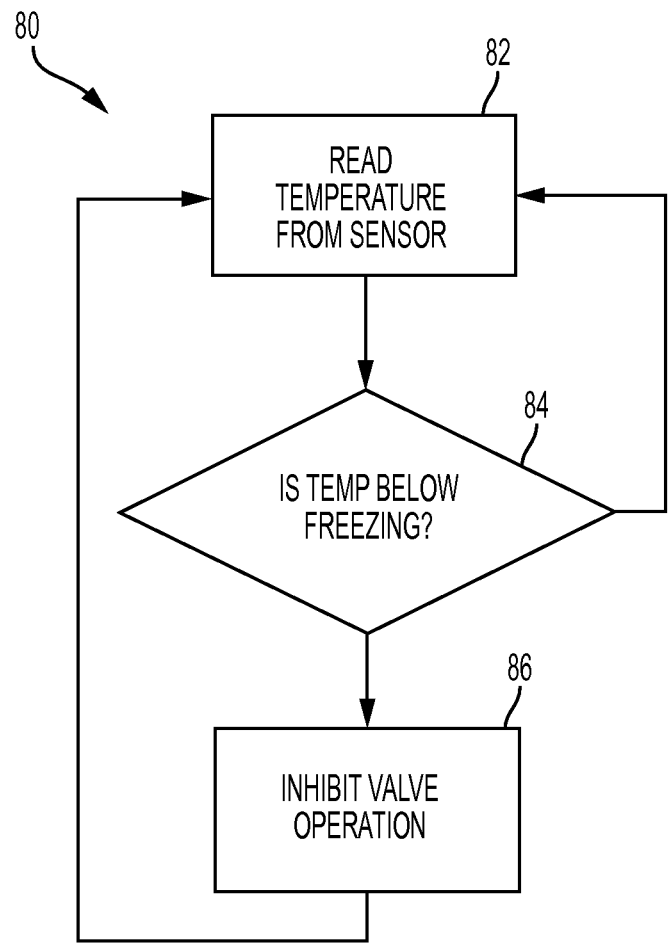
FIG. 4 is a flowchart of a heater control process for an air dryer having a heated valve block.

Referring to FIG. 4, air dryer controller 40 is programmed to implement a heater control process 80 to ensure that valve block 72 is sufficiently heated to a temperature that avoids the likelihood that drain valve 24, inlet valves 42 and 44, or outlet valves 52 and 54 can become frozen. First, controller 40 reads the temperature 82 such as by using temperature 76 positioned in valve block 72. Next, a check 84 is performed to determine whether the temperature is below freezing (or any other predetermined temperature selected to be indicative of a risk that drain valve 24, inlet valves 42 and 44, or outlet valves 52 and 54 will become frozen). If the temperature is below the threshold at check 82, controller 40 inhibits valve operation 86, such as by inhibiting the operation of drain valve 24, inlet valves 42 and 44, and/or outlet valves 52 and 54 until such time as the temperature has risen above the threshold. Thus, if air dryer 16 is turned on after an extended cold soak at low temperature, controller 40 will affirmatively inhibit actuation of drain valve 24, inlet valves 42 and 44, and/or outlet valves 52 and 54 until heater element 70 has warmed valve block 72 sufficiently to prevent any of drain valve 24, inlet valves 42 and 44, and outlet valves 52 and 54 from freezing in an open position and causing an undesired venting of compressed air from locomotive air supply system 10. Preferably, inlet valves 42 and 44 are normally open and exhaust valves 52 and 54 are normally closed in the unpowered state, so that compressed air may flow through air dryer 16 to MR2 when all valves are in an unpowered state. By using closed loop temperature feedback to control inhibit the operation of the series of valves, the start-up time for a cold air dryer is proportional to the starting temperature. Alternatively, a simple system which uses a fixed time delay calculated to allow the valve block to warm to above freezing for the worst case condition may be provided.

The same sensor and controller may be used to turn off the heater, when the temperature of the valve block is at or above the target temperature, thus regulating the temperature of the valve block to a temperature above freezing when the ambient temperature is below freezing; and turning the heater off completely when the ambient temperature, as indicated by the temperature of the valve block, is above freezing.

What is claimed is:

1. An air dryer, comprising;
an inlet for receiving compressed air;
a series of valves including a pair of inlet valves and a pair of exhaust valves and a drain valve associated with a pre-filtration stage positioned in a valve block for controlling the movement of the compressed air through a desiccant;
a heater configured to warm the valve block;
a temperature sensor for outputting a signal indicating the temperature of at least a portion of the air dryer; and
a controller piloting the series of valves that is programmed to inhibit operation of the series of valves until the signal received from the temperature sensor indicates that the series of valves will not freeze when operated.

2. The air dryer of claim 1, wherein the temperature sensor is positioned to determine the temperature of air flowing through the air dryer.

3. The air dryer of claim 1, wherein the temperature sensor is positioned to determine the temperature of the valve block housing the series of valves.

4. A method of preventing frozen air dryer valves, comprising the steps of:
providing an air dryer having an inlet for receiving compressed air, a series of valves positioned in a valve block including a pair of inlet valves and a pair of exhaust valves and a drain valve associated with a pre-filtration stage for controlling the movement of the compressed air through a desiccant, a heater configured to warm the valve block, a temperature sensor for outputting a signal indicating the temperature of at least a portion of the air dryer, a controller piloting the series of valves;
receiving the signal indicating the temperature in the air dryer from the temperature sensor; and
inhibiting operation of the series of valves until if the signal received from the temperature sensor indicates that any of the series of valves could freeze when operated.

5. The method of claim 4, wherein the temperature sensor is positioned to determine the temperature of valve block housing the series of valves of the air dryer.

6. The method of claim 4, wherein the temperature sensor is positioned to determine the temperature of air flowing through the air dryer.

* * * * *